United States Patent
Ma et al.

(10) Patent No.: US 11,927,858 B2
(45) Date of Patent: Mar. 12, 2024

(54) ARRAY SUBSTRATE AND DISPLAY DEVICE

(71) Applicants: HEFEI XINSHENG OPTOELECTRONICS TECHNOLOGY CO., LTD., Anhui (CN); BOE Technology Group Co., Ltd., Beijing (CN)

(72) Inventors: Jian Ma, Beijing (CN); Wenming Ren, Beijing (CN)

(73) Assignees: HEFEI XINSHENG OPTOELECTRONICS TECHNOLOGY CO., LTD., Hefei (CN); BOE TECHNOLOGY GROUP CO., LTD., Beijing (CN)

(*) Notice: Subject to any disclaimer, the term of this patent is extended or adjusted under 35 U.S.C. 154(b) by 130 days.

(21) Appl. No.: 17/408,557

(22) Filed: Aug. 23, 2021

(65) Prior Publication Data
US 2022/0128871 A1   Apr. 28, 2022

(30) Foreign Application Priority Data

Oct. 23, 2020   (CN) .......................... 202011148721.9

(51) Int. Cl.
*G02F 1/1368*   (2006.01)
*G02F 1/1343*   (2006.01)
*G02F 1/1362*   (2006.01)
*G02F 1/1333*   (2006.01)

(52) U.S. Cl.
CPC ...... *G02F 1/1368* (2013.01); *G02F 1/134363* (2013.01); *G02F 1/134372* (2021.01); *G02F 1/134381* (2021.01); *G02F 1/136286* (2013.01); *G02F 1/13685* (2021.01); *G02F 1/133345* (2013.01); *G02F 1/13439* (2013.01)

(58) Field of Classification Search
CPC ......... G02F 1/134363; G02F 1/134372; G02F 1/134381; G02F 1/136286; G02F 1/1368; G02F 1/133345
See application file for complete search history.

(56) References Cited

U.S. PATENT DOCUMENTS

2004/0145541 A1   7/2004   Iki et al.
2012/0268396 A1*  10/2012  Kim .................... G02F 1/1368
                                                    345/173
2019/0227393 A1*  7/2019   Gui .................. G02F 1/134363

FOREIGN PATENT DOCUMENTS

CN   1499468 A     5/2004
CN   103915443 A   7/2014
CN   106935597 A   7/2017

* cited by examiner

*Primary Examiner* — Dung T Nguyen
(74) *Attorney, Agent, or Firm* — Lippes Mathias LLP

(57) ABSTRACT

An array substrate includes: a substrate, and a thin film transistor TFT, a first passivation layer and a transparent electrode disposed on the substrate. Only the first passivation layer is disposed between the transparent electrode and an active layer in the TFT. In this way, a film structure of the array substrate is effectively simplified because no organic insulation layer is disposed in the array substrate, thereby simplifying a manufacturing process of the array substrate and reducing the manufacturing cost of the array substrate.

17 Claims, 9 Drawing Sheets

ARRAY SUBSTRATE AND DISPLAY DEVICE

CROSS-REFERENCE TO RELATED APPLICATION

This application claims priority of the Chinese Patent Application No. 202011148721.9, filed on Oct. 23, 2020 and entitled "ARRAY SUBSTRATE AND DISPLAY DEVICE." the disclosure of which is incorporated herein by reference in its entirety.

TECHNICAL FIELD

The present disclosure relates to the field of display technologies, and in particular relates to an array substrate and a display device.

BACKGROUND

With the development of the display technology field, various products with display functions, various products with display function appear in daily life, such as mobile phones, tablet computers, televisions, laptops, digital photo frames, and navigators, which are to be assembled with display panels without exception. At present, most display panels may include an array substrate, a color filter substrate, and a liquid crystal layer disposed between the array substrate and the color filter substrate. The array substrate may include a thin film transistor (TFT), a first passivation layer for sheathing the TFT, and an organic insulation layer, a common electrode, a second passivation layer and a pixel electrode stacked on the first passivation layer. The pixel electrode may be electrically connected to the TFT.

SUMMARY

Embodiments of the present disclosure provide an array substrate and a display device.

In one aspect, an array substrate is provided. The array substrate includes: a substrate; a thin film transistor disposed on the substrate, wherein the thin film transistor includes an active layer; a first passivation layer disposed on the thin film transistor, wherein the thin film transistor is sheathed by the first passivation layer; a transparent electrode disposed on the first passivation layer, wherein the transparent electrode is in contact with a side, distal from the thin film transistor, of the first passivation layer, and include a hollowed-out region, and an orthographic projection of the active layer on the substrate is within an orthographic projection of the hollowed-out region on the substrate; and a no-load protective electrode within the hollowed-out region isolated from the transparent electrode, wherein the no-load protective electrode is conductive and in contact with a side, distal from the thin film transistor, of the first passivation layer, and an orthographic projection of the no-load protective electrode on the substrate is overlapped with the orthographic projection of the active layer on the substrate.

In some embodiments, the orthographic projection of the active layer on the substrate is within the orthographic projection of the no-load protective electrode on the substrate.

In some embodiments, a minimum distance between an outer boundary of the orthographic projection of the no-load protective electrode on the substrate and an outer boundary of the orthographic projection of the active layer on the substrate is greater than or equal to 2 µm.

In some embodiments, a maximum distance between the outer boundary of the orthographic projection of the no-load protective electrode on the substrate and the outer boundary of the orthographic projection of the active layer on the substrate is less than or equal to 5 µm.

In some embodiments, the transparent electrode and the no-load protective electrode are disposed in a same layer and made of the same material.

In some embodiments, the transparent electrode is a common electrode, and the no-load protective electrode is a planar electrode.

In some embodiments, the transparent electrode is a pixel electrode, and the no-load protective electrode is a patterned electrode, wherein the patterned electrode includes a slit structure.

In some embodiments, the transparent electrode and the no-load protective electrode are both made of a light-transmitting conductive material.

In some embodiments, the transparent electrode and the no-load protective electrode are disposed in a same layer and made of different materials.

In some embodiments, the no-load protective electrode is made of a light-shielding conductive material, and the transparent electrode is made of a light-transmitting conductive material.

In some embodiments, the no-load protective electrode is further isolated from any conductive medium other than the transparent electrode in the array substrate.

In some embodiments, the no-load protective electrode is lapped on a conductive medium in the array substrate, wherein the conductive medium is configured to be connected to a ground.

In some embodiments, the thin film transistor is a bottom gate type thin film transistor or a top gate type thin film transistor.

In some embodiments, the thin film transistor further includes a gate electrode, a gate insulation layer, a source electrode, and a drain electrode; wherein
  the gate electrode is disposed on a side, proximal to the substrate, of the active layer, the gate insulation layer is disposed between the gate electrode and the active layer, and the source electrode and the drain electrode are both disposed on a side, distal from the substrate, of the active layer, and both lapped on the active layer; and
  the transparent electrode is a common electrode, and the array substrate further includes a common electrode line disposed in a same layer as the gate electrode, wherein the gate insulation layer and the first passivation layer include a first via hole, and the common electrode line is lapped on the transparent electrode via the first via hole.

In some embodiments, the array substrate further includes a second passivation layer disposed on the transparent electrode and the no-load protective electrode, and a pixel electrode disposed on the second passivation layer, wherein the pixel electrode is in contact with a side, distal from the transparent electrode, of the second passivation layer, the first passivation layer and the second passivation layer both include a second via hole, and the pixel electrode is lapped on one of the source electrode and the drain electrode via the second via hole.

In some embodiments, the array substrate further includes a gate line electrically connected to the gate electrode, and a data line electrically connected to the other of the source electrode and the drain electrode;

wherein the gate line and the gate electrode are disposed in a same layer, the data line, the source electrode and the drain electrode are disposed in a same layer, and an extension direction of the gate line is intersected with an extension direction of the data line, and the extension direction of the gate line is parallel to an extension direction of the common electrode line.

In some embodiments, the data line includes a data line body and a jumper data line connected to each other; wherein on the substrate, an orthographic projection of the jumper data line is overlapped with an orthographic projection of at least one of the common electrode line and the gate line, and a width of the jumper data line is greater than a width of the data line body.

In another aspect, an array substrate is provided. The array substrate includes: a substrate;

a thin film transistor disposed on the substrate, wherein the thin film transistor includes an active layer; a first passivation layer disposed on the thin film transistor, wherein the thin film transistor is sheathed by the first passivation layer; and a transparent electrode disposed on the first passivation layer, wherein the transparent electrode is in contact with a side, distal from the thin film transistor, of the first passivation layer, and include a hollowed-out region, and an orthographic projection of the active layer on the substrate is within an orthographic projection of the hollowed-out region on the substrate.

In some embodiments, a minimum distance between an outer boundary of the orthographic projection of the hollowed-out region on the substrate and an outer boundary of the orthographic projection of the active layer on the substrate is greater than or equal to 2 μm.

In still another aspect, a display device is provided. The display device includes an array substrate and a color filter substrate arranged oppositely, and a liquid crystal layer disposed between the array substrate and the color filter substrate. The array substrate includes: a substrate;

a thin film transistor disposed on the substrate, wherein the thin film transistor includes an active layer; a first passivation layer disposed on the thin film transistor, wherein the thin film transistor is sheathed by the first passivation layer; a transparent electrode disposed on the first passivation layer, wherein the transparent electrode is in contact with a side, distal from the thin film transistor, of the first passivation layer, and include a hollowed-out region, and an orthographic projection of the active layer on the substrate is within an orthographic projection of the hollowed-out region on the substrate; and a no-load protective electrode within the hollowed-out region isolated from the transparent electrode, wherein the no-load protective electrode is conductive and in contact with a side, distal from the thin film transistor, of the first passivation layer, and an orthographic projection of the no-load protective electrode on the substrate is overlapped with the orthographic projection of the active layer on the substrate.

DETAILED DESCRIPTION

For clearer descriptions of the objectives, technical solutions, and advantages of the present disclosure, embodiments of the present disclosure are described in detail hereinafter with reference to the accompanying drawings.

Figure 1:
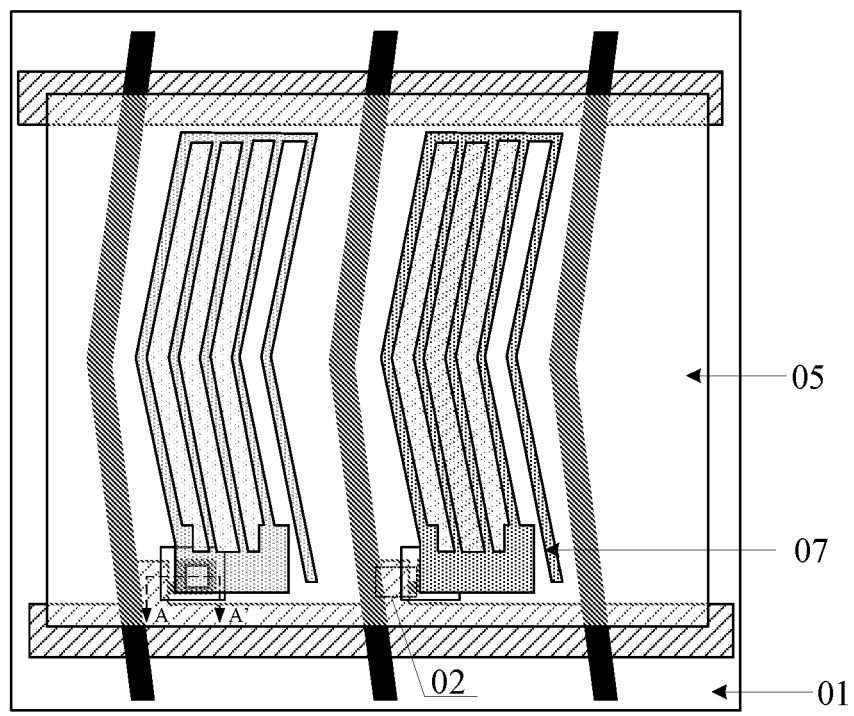
FIG. 1 is a top view of an array substrate.
Figure 2:
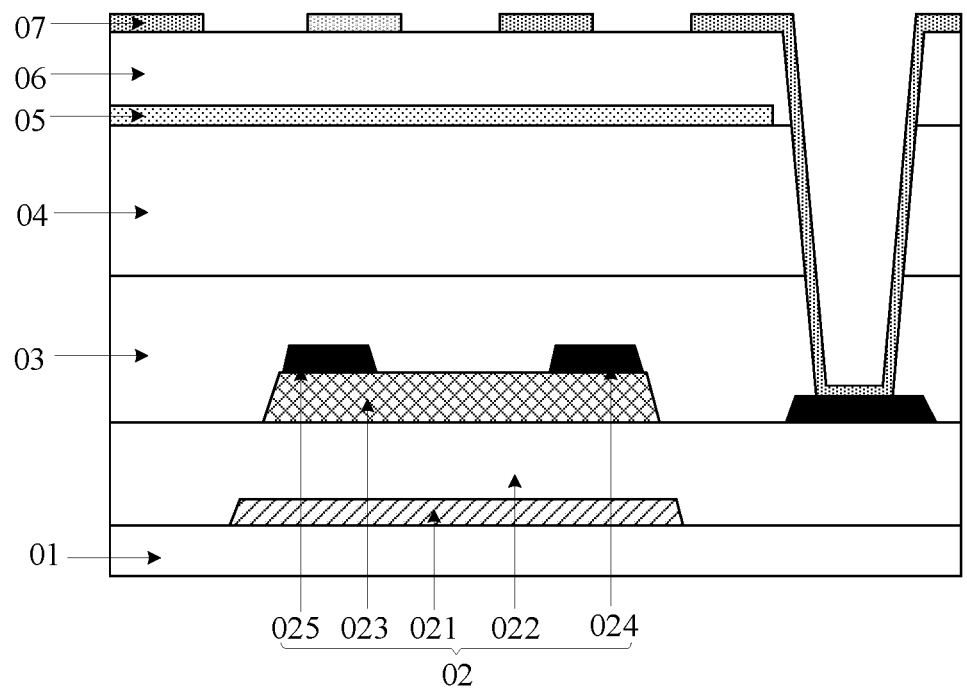
FIG. 2 is a schematic diagram of a film structure of the array substrate at a position A-A' shown in FIG. 1.

Referring to FIG. 1 and FIG. 2, FIG. 1 is a top view of an array substrate, and FIG. 2 is a schematic diagram of a film structure of the array substrate at a position A-A' shown in FIG. 1. The array substrate may include a substrate 01, and a thin film transistor (TFT) 02, a first passivation layer 03, an organic insulation layer 04, a common electrode 05, a second passivation layer 06 and a pixel electrode 07 stacked on the substrate 01.

The TFT 02 may include a gate electrode 021, a gate insulation layer 022, an active layer 023, a source electrode 024 and a drain electrode 025. The gate insulation layer 022 is disposed between the gate electrode 021 and the active layer 023, and the source electrode 024 and the drain electrode 025 are both lapped on the active layer 023. The pixel electrode 07 may be lapped on one of the source electrode 024 and the drain electrode 025 in the TFT 02.

Figure 3:
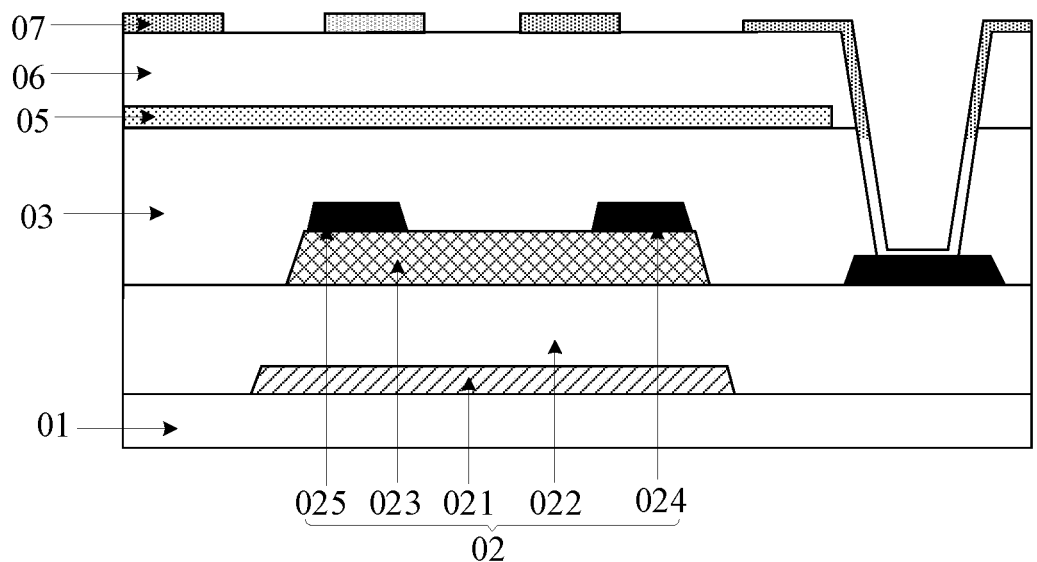
FIG. 3 is a schematic diagram of another film structure of the array substrate at the position A-A' shown in FIG. 1.

In order to simplify a method for manufacturing the array substrate shown in FIG. 1 and reduce the cost of the array substrate, the organic insulation layer in the array substrate may be removed, as shown in FIG. 3. However, in the case that the organic insulation layer in the array substrate is removed, a distance between the common electrode 05 and the active layer 023 in the TFT 02 is small, and a voltage applied to the common electrode 05 affects turn-on or turn-off of the TFT 02.

For example, in FIG. 2, the distance between the common electrode 05 and the active layer 023 in the TFT 02 is a sum of a thickness of the first passivation layer 03 (about 3000 Å) and a thickness of the organic insulation layer 04 (about 25000 Å). Since the distance between the common electrode 05 and the active layer 023 is large, the common electrode 05 does not affect the TFT 02. In FIG. 3, the distance between the common electrode 05 and the active layer 023 in the TFT 02 is only equal to the thickness of the first passivation layer 03. Since the distance between the common electrode 05 and the active layer 023 is small, the common electrode affects the TFT 02.

Figure 4:
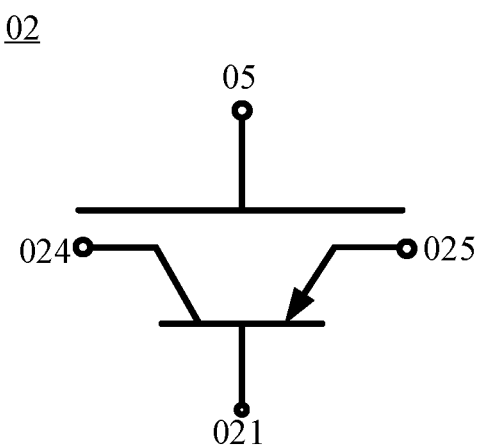
FIG. 4 is an equivalent schematic diagram of a TFT in the array substrate shown in FIG. 3.

In the case that the distance between the common electrode 05 and the active layer 023 in the TFT 02 is small, the TFT 02 is equivalent to a dual-gate type TFT. Referring to FIG. 4. FIG. 4 is an equivalent schematic diagram of the TFT in the array substrate shown in FIG. 3. The TFT 02 includes two gate electrodes (the gate electrode 021 and the common electrode 05). Based on a working principle of the dual-gate type TFT, in the case that voltages applied to two gate electrodes of the dual-gate type TFT are both greater than 0, the dual-gate type TFT promotes the charging of the pixel electrode, in the case that the voltages applied to two gate electrodes of the dual-gate type TFT are both less than 0, the dual-gate TFT suppresses a leakage current between the source electrode 024 and the drain electrode 025; and in the case that a product of the voltages applied to two gate electrodes of the dual gate type TFT is less than 0, that is, the voltage applied to one gate electrode is greater than 0 and the voltage applied to the other gate electrode is less than 0, two gate electrodes suppress each other and affect turn-on or turn-off of the dual-gate type TFT.

Figure 5:
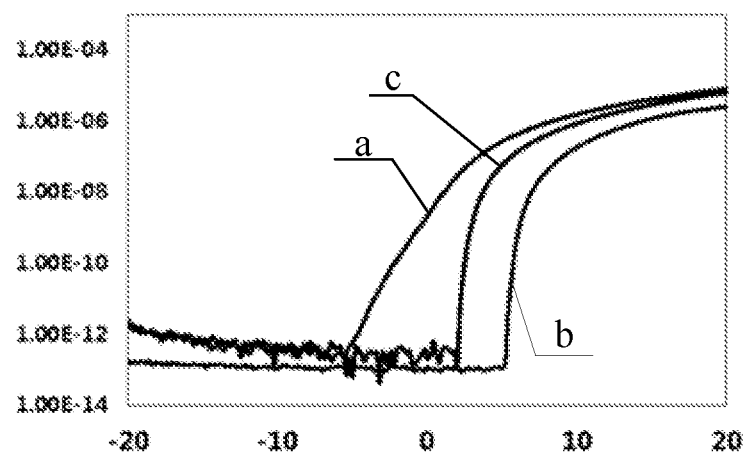
FIG. 5 is a characteristic curve diagram of applying different voltages to two gate electrodes in the TFT shown in FIG. 4.

Referring to FIG. 5, FIG. 5 is a characteristic curve diagram of applying different voltages to two gate electrodes in the TFT shown in FIG. 4. The abscissa represents a constant voltage (unit: V) applied to the gate electrode 021, and the ordinate represents a channel current in the active layer 023 in the TFT. Three curves in FIG. 5 are a curve a, a curve b, and a curve c, respectively. The curve a indicates the characteristic curve of the TFT in the case that the constant voltage greater than 0 (e.g., +4.6 V) is applied to the common electrode 05; the curve b indicates the characteristic curve of the TFT in the case that the constant voltage less than 0 (e.g., −4.6 V) is applied to the common electrode 05; and the curve c indicates the characteristic curve of the TFT in the case that no voltage is applied to the common electrode 05.

As shown in FIG. 5, in the case that no voltage is applied to the common electrode 05, the TFT 02 is not affected by the common electrode 05. During normal operation of the TFT 02, the TFT 02 is turned on in the case that a positive voltage is applied to the gate electrode 021. In the case that the positive voltage is applied to the common electrode 05, the TFT 02 is turned on earlier by the positive voltage applied to the common electrode 05 prior to being controlled by the gate electrode 021; and in the case that a negative voltage is applied to the common electrode 05, the TFT 02 is turned on later by the negative voltage applied to the common electrode 05 prior to being controlled by the gate electrode 021.

Thus, in the case that the distance between the common electrode 05 and the active layer 023 in the TFT 02 is small, the voltage applied to the common electrode 05 affects turn-on or turn-off of the TFT 02.

In the case that turn-on or turn-off of the TFT 02 is affected by the common electrode 05, the TFT 02 affects a charge rate of the pixel electrode 07.

Figure 6:
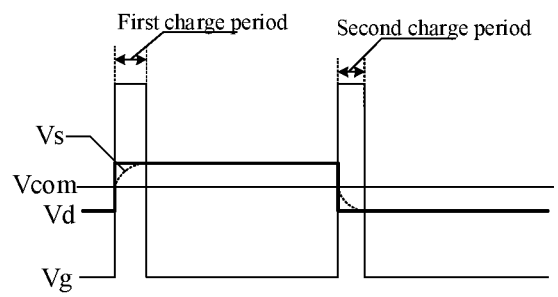
FIG. 6 is a time sequence diagram of voltages applied to the electrodes in the array substrate shown in FIG. 2 and FIG. 3.

For example, referring to FIG. 6, FIG. 6 is a time sequence diagram of voltages applied to the electrodes in the array substrate shown in FIG. 2 and FIG. 3.

Vg indicates a voltage applied to the gate electrode 021 in the TFT 02. The Vg may help to determine turn-on or turn-off of the TFT 02. For example, in the case that the Vg is at a high level, the TFT 02 is turned on; in the case that the Vg is at a low level, the TFT 02 is turned off.

Vcom indicates a voltage applied to the common electrode. Vcom is typically a constant voltage.

Vd indicates a voltage applied to the drain electrode 025 in the TFT 02. Vd is configured to charge the pixel electrode 07. In the case that the Vd is at the high level, liquid crystal molecules are deflected in one direction under a joint action of the pixel electrode 07 and the common electrode 05 in response to the pixel electrode 07 being charged; in the case that Vd is at the low level, the liquid crystal molecules are deflected in another direction under the joint action of the pixel electrode 07 and the common electrode 05 in response to the pixel electrode 07 being charged.

Vs indicates a voltage applied to the source electrode 024 in the TFT 02. In the case that the TFT 02 is turned on, the signal Vs is gradually changed from the voltage same as that applied to the common electrode 05 to the voltage same as that applied to the drain electrode 025, so as to charge the pixel electrode 07.

With reference to a time sequence of the voltages applied to various electrodes in the array substrate shown in FIG. 6, it is assumed that voltage values applied to various electrodes in a first charge period and a second charge period are as shown in Table 1.

TABLE 1

| | Vg (unit: V) | Vcom (unit: V) | Vd (unit: V) | Vs (unit: V) |
|---|---|---|---|---|
| First charge period | 20 | 4.6 | 9.4 | 4.6→9.4 |
| Second charge period | 20 | 4.6 | 0.2 | 4.6→0.2 |

As shown in Table 1, in the first charge period, Vg is 20 V, the TFT is turned on, Vd is 9.4 V. and Vs may be gradually changed from 4.6 V to 9.4 V. In this way, the voltage of 9.4 V may be applied to the pixel electrode 07, and the liquid crystal molecules are deflected in one direction under the joint action of the pixel electrode 07 with the voltage of 9.4 V applied and the common electrode 05 with the voltage of 4.6 V applied. In the second charge period Vg is 20 V, the TFT is turned on. Vd is 0.2 V, and Vs may be gradually changed from 4.6 V to 0.2 V. In this way, the voltage of 0.2 V may be applied to the pixel electrode 07, and the liquid crystal molecules are deflected in another direction under the joint action of the pixel electrode 07 with the voltage of 0.2 V applied and the common electrode 05 with the voltage of 4.6 V applied.

In the case that the voltages shown in FIG. 6 are applied to the various electrodes in the array substrate shown in FIG. 2 and FIG. 3 in the time sequence, values of the channel current of the TFT 02 in the array substrate at the beginning and at the time of 50% charging of the pixel electrode 07 are as shown in Table 2.

TABLE 2

| Channel current | Array substrate corresponding to FIG. 2 | | | Array substrate corresponding to FIG. 3 | | |
| --- | --- | --- | --- | --- | --- | --- |
| | Beginning | Time of charging 50% | Loss | Beginning | Time of charging 50% | Loss |
| First charge period | 3.5 µA | 1.8 µA | 49% | 2.7 µA | 0.8 µA | 70% |
| Second charge period | 6.0 µA | 3.1 µA | 48% | 4.9 µA | 2.5 µA | 49% |
| Illumination of a displayed picture with a grayscale of 255 | 410 nits | | | 360 nits | | |

As shown in Table 2, in the first charge period, in the case of the value of the channel current of the TFT 02 in the array substrate shown in FIG. 2 from the beginning to the time of 50% charging of the pixel electrode 07, the channel current is reduced from 3.5 pA to 1.8 pA with a loss of 49%; in the case of the value of the channel current of the TFT 02 in the array substrate shown in FIG. 3 from the beginning to the time of 50% charging of the pixel electrode 07, the channel current is reduced from 2.7 pA to 0.8 pA with a loss of 70%.

Therefore, in the case that no organic insulation layer is disposed on the array substrate and the distance between the common electrode 05 and the active layer 023 in the TFT 02 in the array substrate is small, the voltage applied to the common electrode 05 affects turn-on or turn-off the TFT 02, thereby resulting in large loss of the channel current of the TFT 02 during the charging of the pixel electrode 07. In this way, the charge rate is insufficient in the case that the pixel electrode 07 is charged, thereby eventually resulting in low illumination of the subsequently displayed picture.

For example, as shown in Table 2, the illumination of a display device prepared by the array substrate shown in FIG. 2 is 410 nits in displaying the picture with the grayscale of 255; the illumination of a display device prepared by the array substrate shown in FIG. 3 is 360 nits in displaying the picture with the grayscale being 255. Therefore, in the case that the organic insulation layer is removed, the loss of the illumination of the subsequently displayed picture is about 12% under the effect of the common electrode 05.

Figure 7:
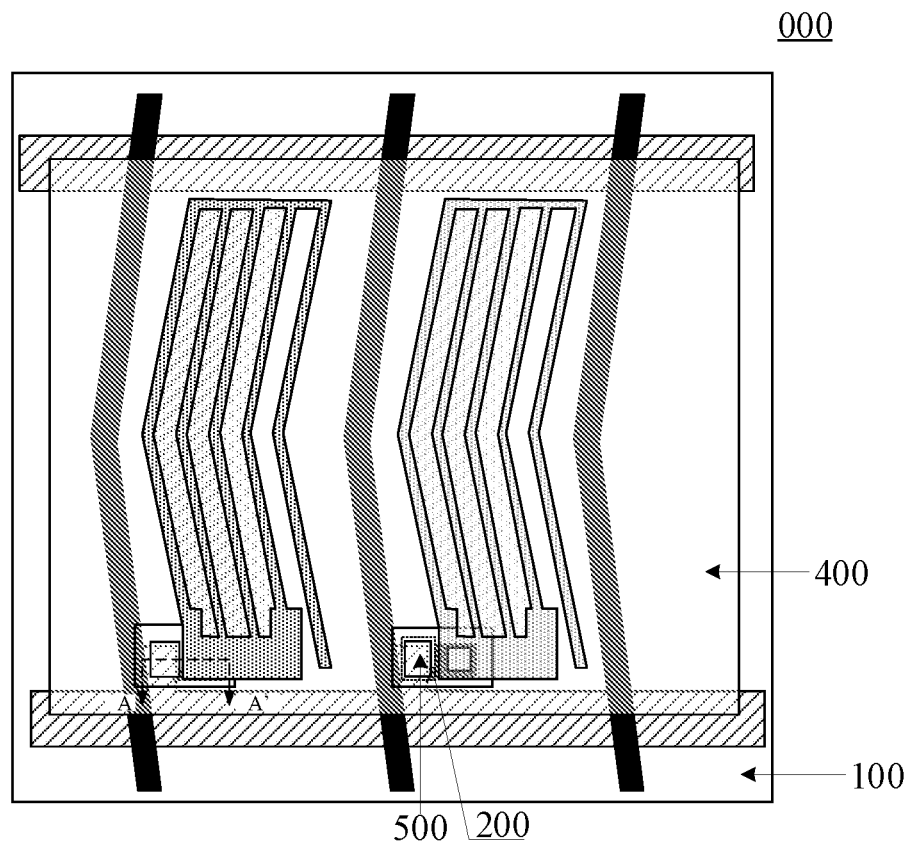
FIG. 7 is a top view of an array substrate according to an embodiment of the present disclosure.
Figure 8:
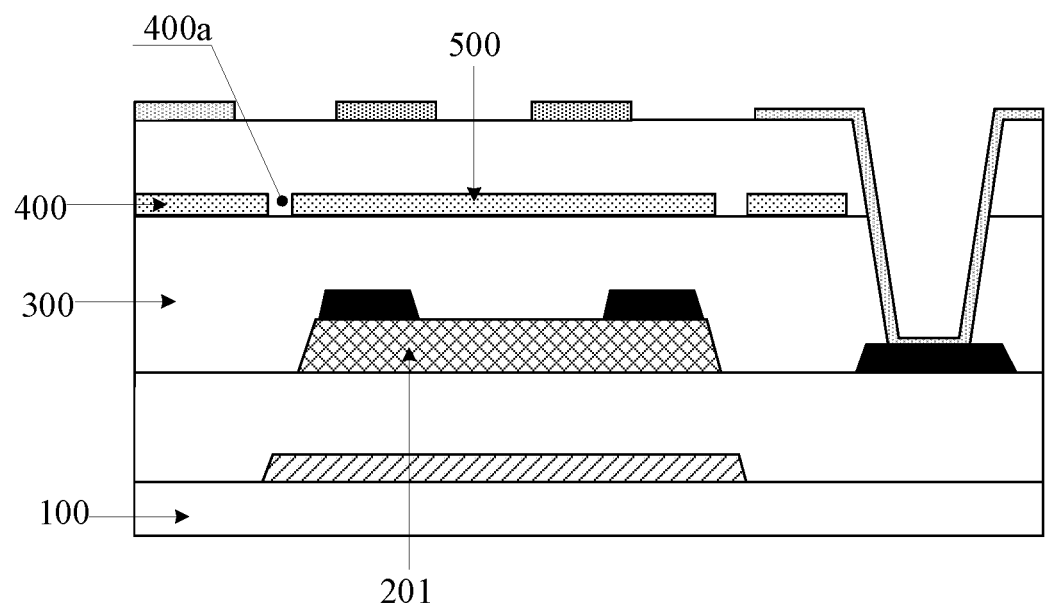
FIG. 8 is a schematic diagram of a film structure of the array substrate at a position A-A' shown in FIG. 7.

Referring to FIG. 7 and FIG. 8, FIG. 7 is a top view of an array substrate according to an embodiment of the present disclosure, and FIG. 8 is a schematic diagram of a film structure of the array substrate at a position A-A' shown in FIG. 7. The array substrate 000 may include:

a substrate 100, and a TFT 200, a first passivation layer 300, a transparent electrode 400 and a no-load protective electrode 500 disposed on the substrate 100.

The TFT 200 may include an active layer 201.

The first passivation layer 300 may be disposed on the TFT 200 and the TFT 200 may be sheathed by the first passivation layer 300.

The transparent electrode 400 may be disposed on the first passivation layer 300 and may be in contact with a side, distal from the TFT 200, of the first passivation layer 300. In the present disclosure, the transparent electrode 400 may include a hollowed-out region 400a. An orthographic projection of the active layer 201 in the TFT 200 on the substrate 100 may be within an orthographic projection of the hollowed-out region 400a on the substrate 100. In this way, the orthographic projection of the transparent electrode 400 on the substrate 100 is not overlapped with the orthographic projection of the active layer 201 in the TFT 200 on the substrate 100.

It should be noted that the transparent electrode 400 in the present disclosure may be a common electrode or a pixel electrode in the array substrate 000. In an exemplary embodiment, in the case that the transparent electrode 400 is the common electrode, the pixel electrode in the array substrate 000 is disposed on a side, distal from the substrate 100, of the transparent electrode 400; and in the case that the transparent electrode 400 is the pixel electrode, the common electrode in the array substrate 000 is disposed on a side, distal from the substrate 100, of the transparent electrode 400.

The no-load protective electrode 500 is conductive, and may be disposed on the first passivation layer 300 and in contact with a side, distal from the TFT 200, of the first passivation layer 300. In an exemplary embodiment, the no-load protective electrode 500 may be within the hollowed-out region 400a, and may be isolated from the transparent electrode 400. The orthographic projection of the no-load protective electrode 500 on the substrate 100 may be overlapped with the orthographic projection of the active layer 201 in the TFT 200 on the substrate 100.

In embodiments of the present disclosure, the orthographic projection of the transparent electrode 400 on the substrate 100 is not overlapped with the orthographic projection of the active layer 201 in the TFT 200 on the substrate 100. Thus, the voltage applied to the transparent electrode 400 slightly affects turn-on or turn-off of the TFT 200, even in the case that the insulation layer between the transparent electrode 400 and the active layer 201 is only the first passivation layer 300 (that is, the distance between the transparent electrode 400 and the active layer 201 is small). In this way, the charge rate during the subsequent charge of the pixel electrode is slightly affected, such that the illumination of the subsequently displayed picture is high, and a display effect of the subsequently displayed picture is improved effectively.

In the present disclosure, since the no-load protective electrode 500 is isolated from the transparent electrode 400, the voltage applied to the transparent electrode 400 is not transmitted to the no-load protective electrode 500. In a possible embodiment, the no-load protective electrode 500 is not only isolated from the transparent electrode 400, but also isolated from any conductive medium in the array substrate 000. Therefore, no voltage is applied to the no-load protective electrode 500, and turn-on or turn-off of the TFT 200 is slightly affected. In another possible embodiment, the no-load protective electrode 500 may be lapped on the conductive medium in the array substrate 000, wherein the conductive medium is configured to be connected to a ground. Therefore, even in the case that the no-load protective electrode 500 is connected to the conductive medium in the array substrate 000, the no-load protective electrode 500 is connected to the ground via the conductive medium, and the voltage of 0 V is applied to the no-load protective electrode 500, such that turn-on or turn-off of the TFT 200 is slightly affected.

Further, the no-load protective electrode 500 is conductive, thus the no-load protective electrode 500 may shield an external electric field to a certain extent. The no-load protective electrode 500 effectively reduces a probability that the TFT 200 is interfered by the external electric field, and electrical properties of the TFT 200 are further improved to increase the charge rate during the subsequent charge of the pixel electrode, and thus the display effect of the subsequently displayed picture is improved effectively.

In summary, the array substrate according to an embodiment of the present disclosure includes a substrate, and a TFT, a first passivation layer, a transparent electrode and a no-load protective electrode disposed on the substrate. Only the first passivation layer is disposed between the transparent electrode and the active layer in the TFT. In this way, the film structure of the array substrate is effectively simplified because of the non-existence of organic insulation layer in the array substrate, thereby simplifying the manufacturing process of the array substrate and reducing the manufacturing cost of the array substrate. Further, the orthographic projection of the transparent electrode on the substrate is not overlapped with the orthographic projection of the active layer in the TFT on the substrate. Thus, the voltage applied to the transparent electrode slightly affects turn-on or turn-off of the TFT, even in the case that the distance between the transparent electrode and the active layer is small. In this way, the charge rate during the subsequent charge of the pixel electrode is slightly affected, such that the illumination of the subsequently displayed picture is high, and the display effect of the subsequently displayed picture is improved effectively. At the same time, since the no-load protective electrode is isolated from the transparent electrode, the voltage applied to the transparent electrode is not transmitted to the no-load protective electrode. Therefore, the conductive no-load protective electrode may shield the external electric field to a certain extent. The probability that the TFT is interfered by the external electric field is effectively reduced, and the electrical properties of the TFT are further improved to increase the charge rate during the subsequent charge of the pixel electrode, and thus the display effect of the subsequently displayed picture is improved effectively.

In some embodiments, as shown in FIG. 7 and FIG. 8, the orthographic projection of the active layer 201 in the TFT 200 in the array substrate 000 on the substrate 100 may be within the orthographic projection of the no-load protective electrode 500 on the substrate 100. In this way, the no-load protective electrode 500 may protect the TFT 200 better and prevent the TFT 200 from being interfered by the external electric field.

Figure 9:
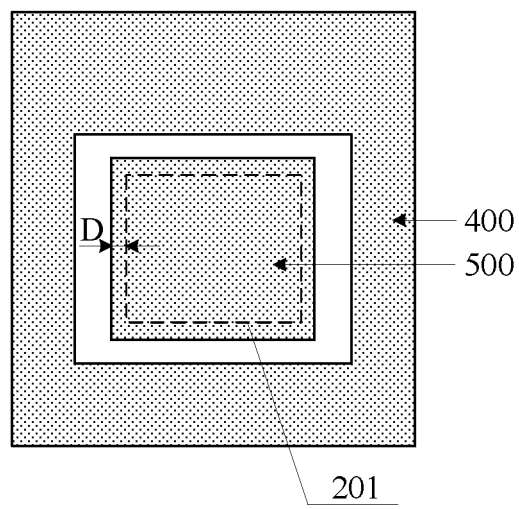
FIG. 9 is a schematic diagram of a positional relationship between a transparent electrode and a no-load protective electrode according to an embodiment of the present disclosure.
Figure 10:
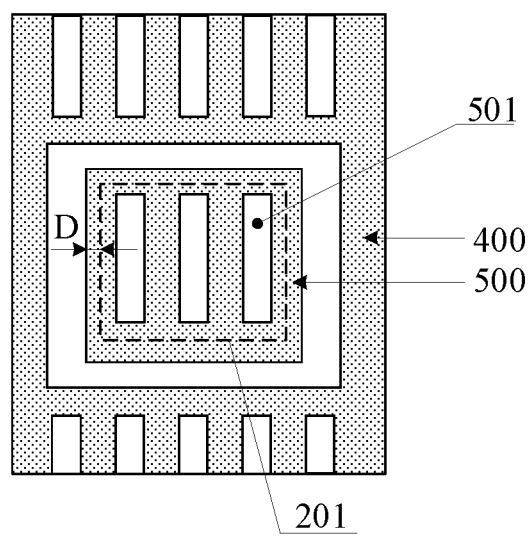
FIG. 10 is a schematic diagram of another positional relationship between a transparent electrode and a no-load protective electrode according to an embodiment of the present disclosure.

In order to see a positional relationship between the transparent electrode 400 and the no-load protective electrode 500 in the array substrate 000 more clearly, references are made to FIG. 9 and FIG. 10. FIG. 9 is a schematic diagram of a positional relationship between a transparent electrode and a no-load protective electrode according to an embodiment of the present disclosure. FIG. 10 is a schematic diagram of another positional relationship between a transparent electrode and a no-load protective electrode according to an embodiment of the present disclosure. In FIG. 9 and FIG. 10, a distance between an outer boundary of the orthographic projection of the no-load protective electrode 500 on the substrate 100 and an outer boundary of the orthographic projection of the active layer 201 in the TFT 200 on the substrate 100 is labeled D. A minimum distance between the outer boundary of the orthographic projection of the no-load protective electrode 500 on the substrate 100 and the outer boundary of the orthographic projection of the active layer 201 in the TFT 200 on the substrate 100 is greater than or equal to 2 µm. In this case, even in the case that film layers all have manufacturing deviations in the manufacturing process of the array substrate, it may be ensured that the orthographic projection of the transparent electrode 400 on the substrate 100 is not overlapped with the orthographic projection of the active layer 201 on the substrate 100. It should be noted that a maximum distance between the outer boundary of the orthographic projection of the no-load protective electrode 500 on the substrate 100 and the outer boundary of the orthographic projection of the active layer 201 in the TFT 200 on the substrate 100 is usually required to be less than or equal to 5 µm.

It should be noted that the no-load protective electrode 500 in the array substrate 000 may have many structures. The embodiments of the present disclosure are described exemplarily with the following two possible embodiments as an example.

In a first possible embodiment, as shown in FIG. 9, the no-load protective electrode 500 may be a planar electrode.

In a second possible embodiment, as shown in FIG. 10, the no-load protective electrode 500 may be a patterned electrode. In an exemplary embodiment, the no-load protective electrode 500 may include a slit structure 501.

It should be noted that, the common electrode in the array substrate 000 is typically the planar electrode, and the pixel electrode in the array substrate 000 is usually the patterned electrode, which typically includes the slit structure as well. Therefore, for simplification of a one-time patterning process, in the case that the transparent electrode 400 on the first passivation layer 300 is the common electrode, the structure of the no-load protective electrode 500 on the first passivation layer 300 may be the structure of the above first possible embodiment. In the case that the transparent electrode 400 on the first passivation layer 300 is the pixel electrode, the structure of the no-load protective electrode 500 on the first passivation layer 300 may be the structure of the above second possible embodiment.

In some embodiments, a material of the active layer 201 in the TFT 200 may include an oxide semi-conductor material. For example, the oxide semi-conductor material may be indium gallium zinc oxide (IGZO).

In some embodiments, the no-load protective electrode 500 on the first passivation layer 300 and the transparent electrode 400 are disposed in a same layer and made of the same material. In this way, the transparent electrode 400 and the no-load protective electrode 500 are formed by a same one-time patterning process, such that the manufacturing process of the array substrate 000 may be further simplified and the manufacturing cost of the array substrate 000 may be reduced simultaneously.

In this case, the transparent electrode 400 and the no-load protective electrode 500 may both be made of a light-transmitting conductive material. For example, the light-transmitting conductive material usually includes indium tin oxide (ITO). In this way, in the case that the material of the no-load protective electrode 500 includes the ITO, the ITO better absorbs ultraviolet light with a short wavelength=. Therefore, in the case that an overlapping region between the orthographic projection of the no-load protective electrode 500 on the substrate 100 is overlapped with the orthographic projection of the active layer 201 on the substrate 100, the no-load protective electrode 500 may absorb the ultraviolet light and prevent the ultraviolet light from being directly irradiated on the active layer 201 made of the oxide semi-conductor material, thereby reducing a probability that the ultraviolet light affects turn-on or turn-off of the TFT 200.

In another possible embodiment, the no-load protective electrode 500 on the first passivation layer 300 is disposed in a same layer as the transparent electrode 400, but the material of the no-load protective electrode 500 may be different from the material of the transparent electrode 400.

In an exemplary embodiment, the transparent electrode 400 may be made of a light-transmitting conductive material, and the no-load protective electrode 500 may be made of a light-shielding conductive material. For example, the light-shielding conductive material may include a metal material. In this way, in the case that the orthographic projection of the no-load protective electrode 500 on the substrate 100 is overlapped with the orthographic projection of the active layer 201 on the substrate 100, the no-load protective electrode 500 may shield external light and prevent the external light from being directly irradiated on the active layer 201 made of the oxide semi-conductor material, thereby reducing a probability that the external light affects turn-on or turn-off of the TFT 200.

In some embodiments, the TFT 200 in the array substrate 000 in the present disclosure may be a bottom gate type TFT or a top gate type TFT. The following embodiments are described exemplarily with the TFT 200 in the array substrate 000 as the bottom-gate type TFT and the transparent electrode 400 in the array substrate 000 as the common electrode.

Figure 11:
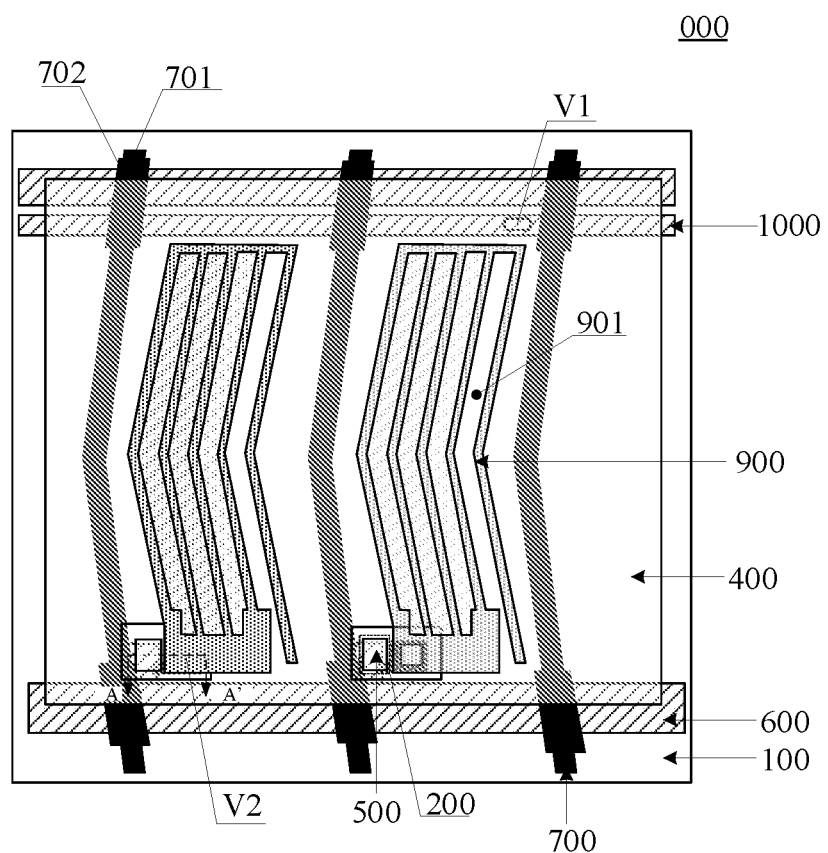
FIG. 11 is a top view of another array substrate according to an embodiment of the present disclosure.
Figure 12:
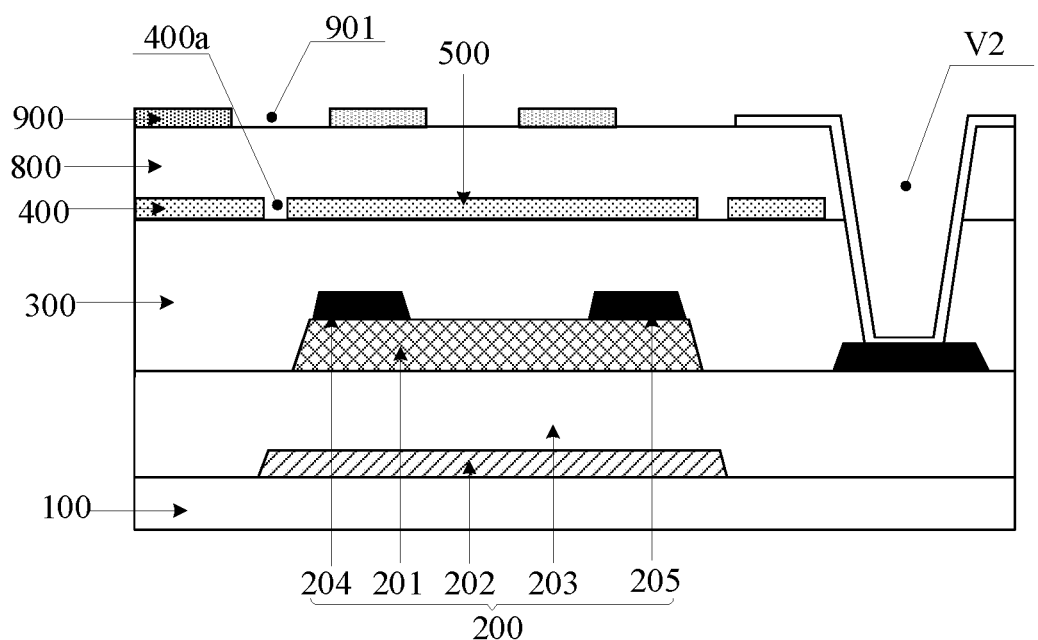
FIG. 12 is a schematic diagram of a film structure of the array substrate at a position A-A' shown in FIG. 11.

Referring to FIG. 11 and FIG. 12, FIG. 11 is a top view of another array substrate according to an embodiment of the present disclosure, and FIG. 12 is a schematic diagram of a film structure of the array substrate at a position A-A' shown in FIG. 11. The TFT 200 in the array substrate 000 may further include a gate electrode 202, a gate insulation layer 203, a source electrode 204, and a drain electrode 205. The gate electrode 202 in the TFT 200 is disposed on a side, proximal to the substrate 100, of the active layer 201, and the gate insulation layer 203 is disposed between the gate electrode 202 and the active layer 201. The source electrode 204 and the drain electrode 205 are both disposed on a side, distal from the substrate 100, of the active layer 201, and both lapped on the active layer 201.

In embodiments of the present disclosure, the array substrate 000 may further include a gate line 600 electrically connected to the gate electrode 202 in the TFT 200 and a data line 700 electrically connected to one of the source electrode 204 and the drain electrode 205. The gate electrode 202 and the gate line 600 may be disposed in a same layer, and the data line 700, the source electrode 204, and the drain electrode 205 may be disposed in a same layer. Further, an extension direction of the data line 700 may be intersected with an extension direction of the gate line 600.

In the present disclosure, the array substrate 000 may further include a second passivation layer 800 disposed on the transparent electrode 400 and the no-load protective electrode 500, and a pixel electrode 900 disposed on the second passivation layer 800. The pixel electrode 900 may be in contact with a side, distal from the transparent electrode 400, of the second passivation layer 800. The first passivation layer 300 and the second passivation layer 800 in the array substrate 000 include a second via hole V2. The pixel electrode 900 may be lapped on the other of the source electrode 204 and the drain electrode 205 in the TFT 02 via the second via hole V2.

It should be noted that the number of gate lines 600, data lines 700 and pixel electrodes 900 in the array substrate 000 may be a plurality. Further, a plurality of gate lines 600 may be arranged in parallel, and a plurality of data lines 700 may also be arranged in parallel. Each of the pixel electrodes 900 may be within a region enclosed by any two adjacent gate lines 600 and any two adjacent data lines 700.

In some embodiments, a material of the pixel electrode 900 in the array substrate 000 may include ITO. In the present disclosure, the pixel electrode 900 may include a plurality of strip-shaped slit structures 901. In this way, the transmittance of the light emitted from the array substrate 000 may be improved based on the slit structure 901.

In embodiments of the present disclosure, in the case that the insulation layer between the transparent electrode 400 and the active layer 201 is only the first passivation layer 300, the distance between the transparent electrode 400 and the data line 700 is small, and a voltage applied to the data line 700 affects the voltage applied to the transparent electrode 400 and may result in a difference between voltages at various positions of the transparent electrode 400, which in turn leads to poor uniformity of the voltage applied to the transparent electrode 400.

In order to improve the uniformity of the voltage applied to the transparent electrode 400, the array substrate 000 may further include a common electrode line 1000 disposed in a same layer as the gate electrode 202. The gate insulation layer 203 and the first passivation layer 300 in the array substrate 000 include a first via hole V1, and the common electrode line 1000 in the array substrate 000 may be lapped on the transparent electrode 400 via the second via hole V1. The common electrode line 1000 may be made of a metal material with low electrical resistivity. In this way, by applying the voltage to the transparent electrode 400 via the common electrode line 1000, the voltage difference at various positions on the transparent electrode 400 may be reduced, such that the uniformity of the voltage applied to the transparent electrode 400 is better.

In some embodiments, in the array substrate 000, an extension direction of the common electrode line 1000 may be parallel to the extension direction of the gate line 600.

In some embodiments, in the array substrate 000, the gate electrode 202 in the TFT 200, the common electrode line 1000 and the gate line 600 are formed by the same conductive layer. That is, the gate electrode 202, the common electrode line 1000 and the gate line 600 are formed by the same one-time patterning process. In this way, the manufacturing process of the array substrate 000 may be further simplified, and the manufacturing cost of the array substrate 000 may be reduced simultaneously. In the array substrate 000, the source electrode 204 and the drain electrode 205 in the TFT 200 and the data line 700 are formed by the same conductive layer. That is, the source electrode 204, the drain electrode 205 and the data line 700 are formed by the same one-time patterning process. In this way, the manufacturing process of the array substrate 000 may be further simplified, and the manufacturing cost of the array substrate 000 may be reduced simultaneously.

In embodiments of the present disclosure, the data line 700 in the array substrate 000 may include a data line body 701 and a jumper data line 702 connected to each other. On the substrate 100, an orthographic projection of the jumper data line 702 is overlapped with an orthographic projection of at least one of the common electrode line 1000 and the gate line 600. Further, on the substrate 100, an orthographic projection of the data line body 701 is staggered from the orthographic projection of the common electrode line 1000 and the orthographic projection of the gate line 600. A width of the jumper data line 702 is greater than a width of the data line body 701. In the present disclosure, in the case that the width of the jumper data line 702 configured to overlap with the gate line 600 or the common electrode line 1000 in the data line 700 is large, a risk of disconnection at an overlapping region between the data line 700 and the gate line 600 or the common electrode line 1000 may be effectively reduced.

In summary, the array substrate according to an embodiment of the present disclosure includes a substrate, and a TFT, a first passivation layer, a transparent electrode, and a no-load protective electrode disposed on the substrate. Only the first passivation layer is disposed between the transparent electrode and the active layer in the TFT. In this way, the film structure of the array substrate is effectively simplified because of the non-existence of organic insulation layer in the array substrate, thereby simplifying the manufacturing process of the array substrate and reducing the manufacturing cost of the array substrate. Further, the orthographic projection of the transparent electrode on the substrate is not overlapped with the orthographic projection of the active layer in the TFT on the substrate. Thus, the voltage applied to the transparent electrode slightly affects turn-on or turn-off of the TFT, even in the case that the distance between the transparent electrode and the active layer is small. In this way, the charge rate during the subsequent charge of the pixel electrode is slightly affected, such that the illumination of the subsequently displayed picture is high, and the display effect of the subsequently displayed picture is improved effectively. At the same time, since the no-load protective electrode is isolated from the transparent electrode, the voltage applied to the transparent electrode is not transmitted to the no-load protective electrode. Therefore, the conductive no-load protective electrode may shield the external electric field to a certain extent. The probability that the TFT is interfered by the external electric field is effectively reduced, and the electrical properties of the TFT are further improved to increase the charge rate during the subsequent charge of the pixel electrode, thus the display effect of the subsequently displayed picture is improved effectively.

Figure 13:
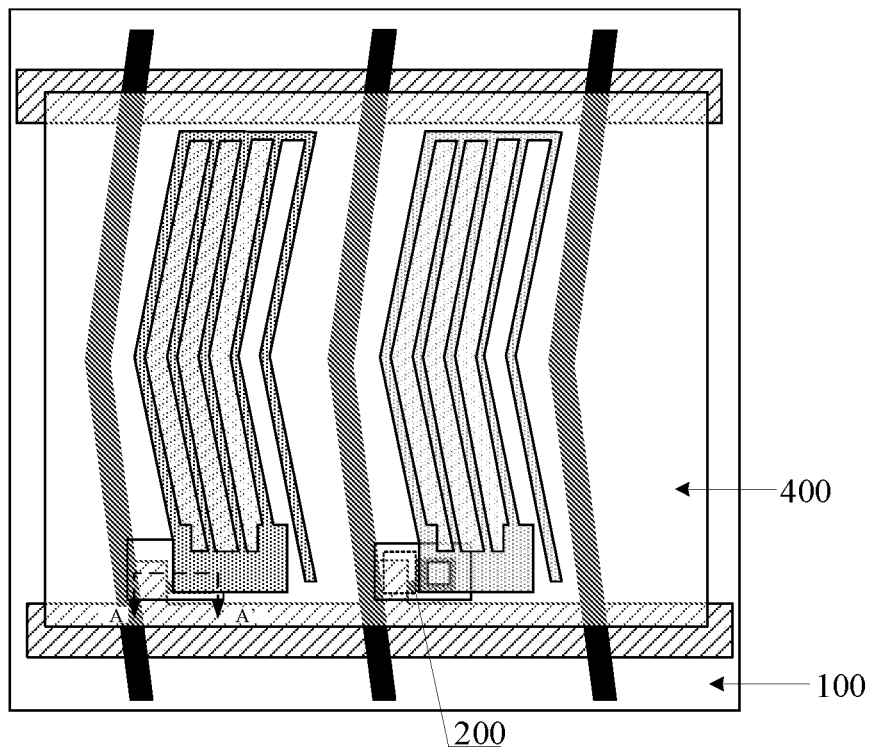
FIG. 13 is a top view of still another array substrate according to an embodiment of the present disclosure.
Figure 14:
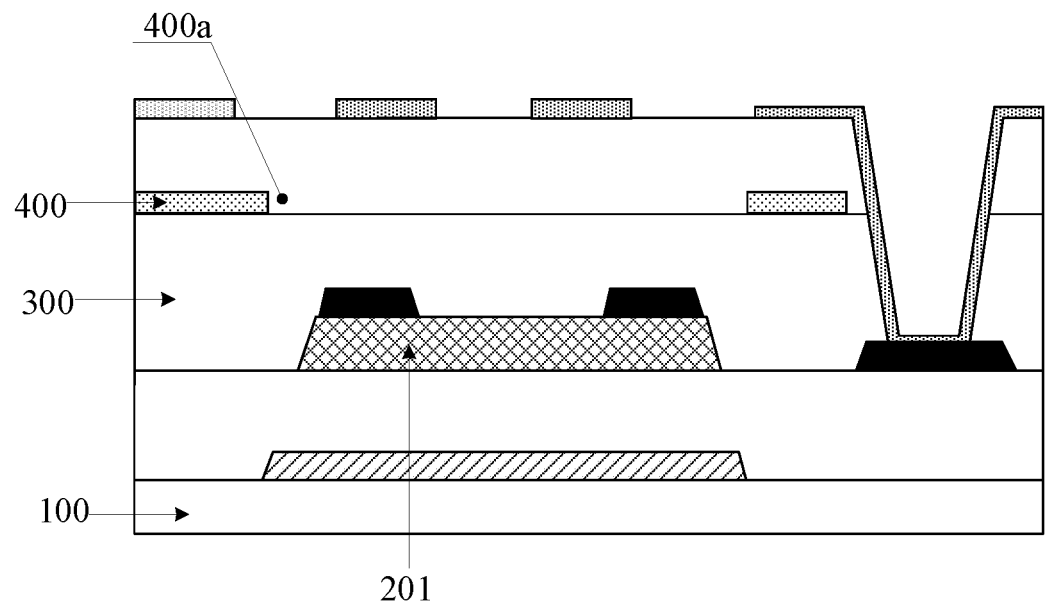
FIG. 14 is a schematic diagram of a film structure of the array substrate at a position A-A' shown in FIG. 13.

Referring to FIG. 13 and FIG. 14, FIG. 13 is a top view of still another array substrate according to an embodiment of the present disclosure, and FIG. 14 is a schematic diagram of a film structure of the array substrate at a position A-A' shown in FIG. 13. The array substrate 000 may include:

a substrate 100, and a TFT 200, a first passivation layer 300 and a transparent electrode 400 disposed on the substrate 100.

The TFT 200 may include an active layer 201.

The first passivation layer 300 may be disposed on the TFT 200, and the TFT 200 is sheathed by the first passivation layer 300.

The transparent electrode 400 may be disposed on the first passivation layer 300, and in contact with a side, distal from the TFT 200, of the first passivation layer 300. In the present disclosure, the transparent electrode 400 may include a hollowed-out region 400a. An orthographic projection of the active layer 201 in the TFT 200 on the substrate 100 may be within an orthographic projection of the hollowed-out region 400a on the substrate 100. In this way, t the orthographic projection of the transparent electrode 400 on the substrate 100 is not overlapped with the orthographic projection of the active layer 201 in the TFT 200 on the substrate 100.

It should be noted that the transparent electrode 400 in the present disclosure may be a common electrode or a pixel electrode in the array substrate 000. In an exemplary embodiment, in the case that the transparent electrode 400 is the common electrode, the pixel electrode in the array substrate 000 is disposed on a side, distal from the substrate 100, of the transparent electrode 400, in the case that the transparent electrode 400 is the pixel electrode, the common electrode in the array substrate 000 is disposed on a side, distal from the substrate 100, of the transparent electrode 400.

In embodiments of the present disclosure, the orthographic projection of the transparent electrode 400 on the substrate 100 is not overlapped with the orthographic projection of the active layer 201 in the TFT 200 on the substrate 100. Tus, the voltage applied to the transparent electrode 400 slightly affects turn-on or turn-off of the TFT 200, even in the case that the insulation layer between the transparent electrode 400 and the active layer 201 is only the first passivation layer 300 (that is, the distance between the transparent electrode 400 and the active layer 201 is small). In this way, the charge rate during the subsequent charge of the pixel electrode is slightly affected, such that the illumination of the subsequently displayed picture is high, and the display effect of the subsequently displayed picture is improved effectively.

In summary, the array substrate according to an embodiment of the present disclosure includes a substrate, and a TFT, a first passivation layer and a transparent electrode disposed on the substrate. Only the first passivation layer is disposed between the transparent electrode and the active layer in the TFT. In this way, the film structure of the array substrate is effectively simplified because of the non-existence of organic insulation layer in the array substrate, thereby simplifying the manufacturing process of the array substrate and reducing the manufacturing cost of the array substrate. Further, the orthographic projection of the transparent electrode on the substrate is not overlapped with the orthographic projection of the active layer in the TFT on the substrate. Thus, the voltage applied to the transparent electrode slightly affects turn-on or turn-off of the TFT, even in the case that the distance between the transparent electrode and the active layer is small. In this way, the charge rate during the subsequent charge of the pixel electrode is slightly affected, such that the illumination of the subsequently displayed picture is high, and the display effect of the subsequently displayed picture is improved effectively.

In some embodiments, as shown in FIG. 13 and FIG. 14, a minimum distance between an outer boundary of the orthographic projection of the hollowed-out region 400a in the transparent electrode 400 on the first passivation layer 300 on the substrate 100 and an outer boundary of the orthographic projection of the active layer 201 in the TFT 200 on the substrate 100 is greater than or equal to 2 μm. In this case, even in the case that film layers all have manufacturing deviations in the manufacturing process of the array substrate, it may be ensured that the orthographic projection of the transparent electrode 400 on the substrate 100 is not overlapped with the orthographic projection of the active layer 201 on the substrate 100. It should be noted that a maximum distance between the outer boundary of the orthographic projection of the hollowed-out region 400a on the substrate 100 and the outer boundary of the orthographic projection of the active layer 201 in the TFT 200 on the substrate 100 is usually required to be less than or equal to 5 μm.

In some embodiments, the TFT 200 in the array substrate 000 in the present disclosure may be a bottom-gate type TFT or a top-gate type TFT. The following embodiments are described exemplarily with the TFT 200 in the array substrate 000 as the bottom-gate type TFT and the transparent electrode 400 in the array substrate 000 as the common electrode.

Figure 15:
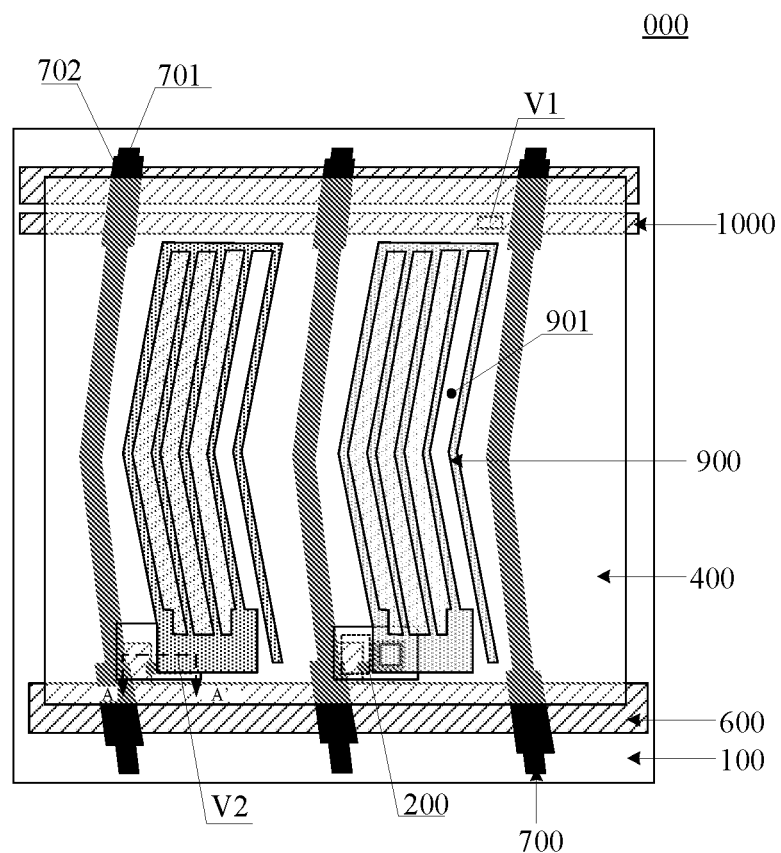
FIG. 15 is a top view of still another array substrate according to an embodiment of the present disclosure.
Figure 16:
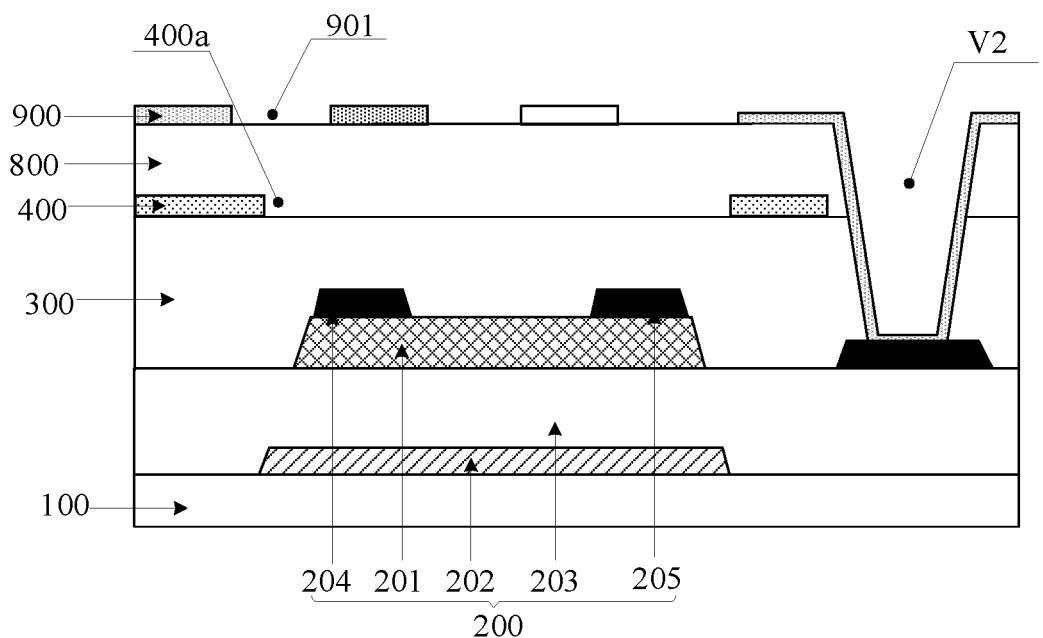
FIG. 16 is a schematic diagram of a film structure of the array substrate at a position A-A' shown in FIG. 15.

Referring to FIG. 15 and FIG. 16, FIG. 15 is a top view of still another array substrate according to an embodiment of the present disclosure, and FIG. 16 is a schematic diagram of a film structure of the array substrate at a position A-A' shown in FIG. 15. The TFT 200 in the array substrate 000 may further include a gate electrode 202, a gate insulation layer 203, a source electrode 204 and a drain electrode 205. The gate electrode 202 in the TFT 200 is disposed on a side, proximal to the substrate 100, of the active layer 201, and the gate insulation layer 203 is disposed between the gate electrode 202 and the active layer 201. The source electrode 204 and the drain electrode 205 are both disposed on a side, distal from the substrate 100, of the active layer 201 and lapped on the active layer 201.

In embodiments of the present disclosure, the array substrate 000 may further include a gate line 600 electrically connected to the gate electrode 202 in the TFT 200 and a data line 700 electrically connected to one of the source electrode 204 and the drain electrode 205. The gate electrode 202 and the gate line 600 may be disposed in a same layer, and the data line 700, the source electrode 204 and the drain electrode 205 may be disposed in a same layer. Further, an extension direction of the data line 700 may be intersected with an extension direction of the gate line 600.

In the present disclosure, the array substrate 000 may further include a second passivation layer 800 disposed on the transparent electrode 400, and a pixel electrode 900 disposed on the second passivation layer 800. The pixel electrode 900 may be in contact with a side, distal from the transparent electrode 400, of the second passivation layer 800. The first passivation layer 300 and the second passivation layer 800 in the array substrate 000 include a second via hole V2. The pixel electrode 900 may be lapped on the other of the source electrode 204 and the drain electrode 205 in the TFT 02 via the second via hole V2.

It should be noted that the number of gate lines 600, data lines 700 and pixel electrodes 900 in the array substrate 000 may be a plurality. Further, a plurality of gate lines 600 may be arranged in parallel, and a plurality of data lines 700 may also be arranged in parallel. Each of the pixel electrodes 900 may be within a region enclosed by any two adjacent gate lines 600 and any two adjacent data lines 700.

In some embodiments, a material of the pixel electrode 900 in the array substrate 000 may include ITO. In the present disclosure, the pixel electrode 900 may include a plurality of strip-shaped slit structures 901. In this way, the transmittance of the light emitted from the array substrate 000 may be improved based on the slit structure 901.

In embodiments of the present disclosure, in the case that the insulation layer between the transparent electrode 400 and the active layer 201 is only the first passivation layer 300, the distance between the transparent electrode 400 and the data line 700 is small, and the voltage applied to the data line 700 affects the voltage applied to the transparent electrode 400 and may result in a difference between voltages at various positions of the transparent electrode 400, which in turn leads to poor uniformity of the voltage applied to the transparent electrode 400.

In order to improve the uniformity of the voltage applied to the transparent electrode 400, the array substrate 000 may further include a common electrode line 1000 disposed in a same layer as the gate electrode 202. The gate insulation layer 203 and the first passivation layer 300 in the array substrate 000 include a first via hole V1, and the common electrode line 1000 in the array substrate 000 may be lapped on the transparent electrode 400 via the first via hole V1. The common electrode line 1000 may be made of a metal material with low electrical resistivity. In this way, by applying the voltage to the transparent electrode 400 via the common electrode line 1000, the voltage difference at various positions on the transparent electrode 400 may be reduced, such that the uniformity of the voltage applied to the transparent electrode 400 is better.

In some embodiments, in the array substrate 000, the extension direction of the common electrode line 1000 may be parallel to the extension direction of the gate line 600.

In some embodiments, in the array substrate 000, the gate electrode 202 in the TFT 200, the common electrode line 1000 and the gate line 600 are formed by the same conductive layer. That is, the gate electrode 202, the common electrode line 1000 and the gate line 600 are formed by the same one-time patterning process. In this way, the manufacturing process of the array substrate 000 may be further simplified, and the manufacturing cost of the array substrate 000 may be reduced simultaneously. In the array substrate 000, the source electrode 204 and the drain electrode 205 in the TFT 200 and the data line 700 are formed by the same conductive layer. That is, the source electrode 204, the drain electrode 205 and the data line 700 are formed by the same one-time patterning process. In this way, the manufacturing process of the array substrate 000 may be further simplified, and the manufacturing cost of the array substrate 000 may be reduced simultaneously.

In embodiments of the present disclosure, the data line 700 in the array substrate 000 may include a data line body 701 and a jumper data line 702 connected to each other. On the substrate 100, an orthographic projection of the jumper data line 702 is overlapped with an orthographic projection of at least one of the common electrode line 1000 and the gate line 600. Further, on the substrate 100, the orthographic projection of the data line body 701 is staggered from the orthographic projection of the common electrode line 1000 and the orthographic projection of the gate line 600. The width of the jumper data line 702 is greater than the width of the data line body 701. In the present disclosure, in the case that the width of the jumper data line 702 configured to overlap with the gate line 600 or the common electrode line 1000 in the data line 700 is large, a risk of disconnection at an overlapping region between the data line 700 and the gate line 600 or the common electrode line 1000 may be effectively reduced.

In summary, the array substrate according to an embodiment of the present disclosure includes a substrate, and a TFT, a first passivation layer and a transparent electrode disposed on the substrate. Only the first passivation layer is disposed between the transparent electrode and the active layer in the TFT. In this way, the film structure of the array substrate is effectively simplified because of the non-existence of organic insulation layer in the array substrate, thereby simplifying the manufacturing process of the array substrate and reducing the manufacturing cost of the array substrate. Further, the orthographic projection of the transparent electrode on the substrate is not overlapped with the orthographic projection of the active layer in the TFT on the substrate. Thus, the voltage applied to the transparent electrode slightly affects turn-on or turn-off of the TFT, even in the case that the distance between the transparent electrode and the active layer is small. In this way, the charge rate during the subsequent charge of the pixel electrode is slightly affected, such that the illumination of the subsequently displayed picture is high, and the display effect of the subsequently displayed picture is improved effectively.

An embodiment of the present disclosure provides a method for manufacturing an array substrate. The method is employed to manufacture the array substrate shown in FIG. 7. The method may include the following steps.

In step A1, a TFT is formed on a substrate. The TFT may include an active layer.

In step B1, a first passivation layer is formed on the TFT, wherein the TFT is sheathed by the passivation layer.

In step C1, a transparent electrode is formed on the first passivation layer. The transparent electrode is in contact with a side, distal from the thin film transistor, of the first passivation layer, and include a hollowed-out region, and an orthographic projection of the active layer in the TFT on the substrate is within an orthographic projection of the hollowed-out region on the substrate.

In step D1, a no-load protective electrode isolated from the transparent electrode is formed in the hollowed-out region. The no-load protective electrode is conductive and in contact with a side, distal from the TFT, of the first passivation layer, and an orthographic projection of the no-load protective electrode on the substrate is overlapped with the orthographic projection of the active layer on the substrate.

An embodiment of the present disclosure provides another method for manufacturing an array substrate. The method is employed to manufacture the array substrate shown in FIG. 11.

The method may include the following steps.

In step A2, a first conductive pattern is formed on a substrate.

In some embodiments, the first conductive pattern may be made of a metal material including molybdenum (Mo), titanium (Ti), copper (Cu) and aluminum (Al), or an alloy material. The first conductive pattern may include a gate electrode, a gate line, and a common electrode line.

In an exemplary embodiment, a first conductive film may be formed on the substrate by any of deposition, coating, sputtering, and the like, and then, a one-time patterning process is performed on the first conductive film to form the first conductive pattern. The one-time patterning process may include photoresist coating, exposure, development, etching, and photoresist stripping.

In step B2, a gate insulation layer is formed on the first conductive pattern.

In some embodiments, the gate insulation layer may be made of silicon dioxide, silicon nitride, a high dielectric constant material, or the like.

In an exemplary embodiment, a gate insulation film may be formed on the substrate with the first conductive pattern by any of deposition, coating, sputtering, and the like, and then, a one-time patterning process is performed on the gate insulation film to form the gate insulation layer. The one-time patterning process may include photoresist coating, exposure, development, etching, and photoresist stripping.

In step C2, an active layer is formed on the gate insulation layer.

In some embodiments, a material of the active layer may include IGZO.

In an exemplary embodiment, an active layer film may be formed on the substrate with the gate insulation layer by any of deposition, coating, sputtering, and the like, and then, a one-time patterning process is performed for the active layer film to form the active layer. The one-time patterning process may include photoresist coating, exposure, development, etching, and photoresist stripping.

In step D2, a second conductive pattern is formed on the active layer.

In some embodiments, the second conductive pattern may be made of a metal material including Mo, Ti, Cu and Al. or an alloy material. The second conductive pattern may include a source electrode, a drain electrode and a data line.

In an exemplary embodiment, a second conductive film may be formed on the substrate with the active layer by any of deposition, coating, sputtering, and the like, and then, a one-time patterning process is performed on the second conductive film to form the second conductive pattern. The one-time patterning process may include photoresist coating, exposure, development, etching, and photoresist stripping.

In step E2, a first passivation layer is formed on the second conductive pattern.

In some embodiments, the first passivation layer may be made of silicon dioxide, silicon nitride or high dielectric constant material, or the like.

In an exemplary embodiment, a first passivation film may be formed on the substrate with the second conductive pattern by any of deposition, coating, sputtering, and the like, and then, a one-time patterning process is performed for the first passivation film to form the first passivation layer. The one-time patterning process may include photoresist coating, exposure, development, etching, and photoresist stripping.

In step F2, a third conductive pattern is formed on the first passivation layer.

In some embodiments, a material of the third conductive pattern may include ITO. The third conductive pattern may include a common electrode and a no-load protective electrode.

In an exemplary embodiment, a third conductive film may be formed on the substrate with the first passivation layer by any of deposition, coating, sputtering, and the like, and then, a one-time patterning process is performed on the third conductive film to form the third conductive pattern. The one-time patterning process may include photoresist coating, exposure, development, etching, and photoresist stripping.

In step G2, a second passivation layer is formed on the third conductive pattern.

In some embodiments, the second passivation layer may be made of silicon dioxide, silicon nitride or high dielectric constant material, or the like.

In an exemplary embodiment, a second passivation film may be formed on the substrate with the third conductive pattern by any of deposition, coating, sputtering, and the like, and then, a one-time patterning process is performed on the second passivation film to form the second passivation layer. The one-time patterning process may include photoresist coating, exposure, development, etching, and photoresist stripping.

In step H2, a pixel electrode is formed on the second passivation layer.

In some embodiments, a material of the pixel electrode may include ITO.

In an exemplary embodiment, a pixel electrode film may be formed on the substrate with the third passivation layer by any of deposition, coating, sputtering, and the like, and then, a one-time patterning process is performed on the pixel electrode film to form the pixel electrode. The one-time patterning process may include photoresist coating, exposure, development, etching, and photoresist stripping.

An embodiment of the present disclosure provides another method for manufacturing an array substrate. The method is employed to manufacture the array substrate shown in FIG. 13. The method may include the following steps.

In step A3, a TFT is formed on a substrate. The TFT may include an active layer.

In step B3, a first passivation layer is formed on the TFT, wherein the TFT is sheathed by the first passivation layer.

In step C3, a transparent electrode is formed on the first passivation layer. The transparent electrode is in contact with a side, distal from the thin film transistor, of the first passivation layer, and include a hollowed-out region, and an orthographic projection of the active layer in the TFT on the substrate is within an orthographic projection of the hollowed-out region on the substrate.

An embodiment of the present disclosure further provides another method for manufacturing an array substrate. The method is employed to manufacture the array substrate shown in FIG. 16. The method may include the following steps.

In step A4, a first conductive pattern is formed on a substrate.

The step A4 may be referred to step A2, which is not repeated herein.

In step B4, a gate insulation layer is formed on the first conductive pattern.

The step B4 may be referred to step B2, which is not repeated herein.

In step C4, an active layer is formed on the gate insulation layer.

The step C4 may be referred to step C2, which is not repeated herein.

In step D4, a second conductive pattern is formed on the active layer.

The step D4 may be referred to step D2, which is not repeated herein.

In step E4, a first passivation layer is formed on the second conductive pattern.

The step E4 may be referred to step E2, which is not repeated herein.

In step F4, a common electrode is formed on the first passivation layer.

In some embodiments, a material of the common electrode may include ITO. The common electrode pattern may include a hollowed-out region.

In an exemplary embodiment, a common electrode film may be formed on the substrate with the first passivation layer by any of deposition, coating, sputtering, and the like, and then, a one-time patterning process is performed on the common electrode film to form the common electrode. The one-time patterning process may include photoresist coating, exposure, development, etching, and photoresist stripping.

In step G4, a second passivation layer is formed on the common electrode.

The step G4 may be referred to step G2, which is not repeated herein.

In step H4, a pixel electrode is formed on the second passivation layer.

The step H4 may be referred to step H2, which is not repeated herein.

Persons skilled in the art may clearly understand that working principles and connection relationships of various structures in the array substrate described above may be referred to the corresponding contents in the embodiments of the structures of the array substrate described above for convenience and simplicity of description, which are not repeated herein.

Figure 17:
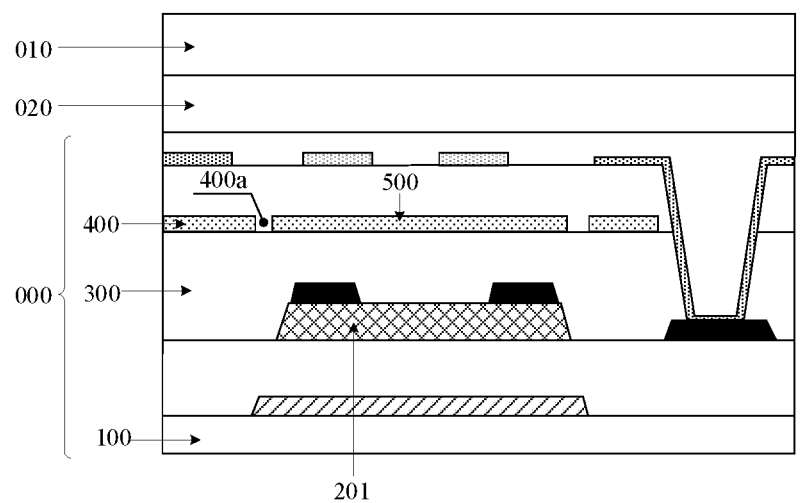
FIG. 17 is a schematic diagram of a film structure of a display device according to an embodiment of the present disclosure.

An embodiment of the present disclosure further provides a display device. The display device may be any product or component with a display function, such as a liquid crystal display panel, electronic paper, a mobile phone, a tablet computer, a television, a monitor, a laptop, a digital photo frame, a navigator, and the like. In an embodiment of the present disclosure, as shown in FIG. 17, the display device may include an array substrate 000 and a color filter substrate 010 arranged oppositely, and a liquid crystal layer 020 disposed between the array substrate 000 and the color filter substrate 010. The array substrate 000 may be any of the above array substrates. For example, the array substrate 000 may be the array substrate shown in FIG. 7, FIG. 11, FIG. 13, or FIG. 15.

It should be noted that dimensions of layers and regions may be exaggerated for clarity of illustration in the drawings. It may also be understood that when an element or layer is referred to as being "on" another element or layer, it may be directly on another element, or there may be an intermediate layer. Alternatively, it may be understood that when an element or layer is referred to as being "under" another element or layer, it may be directly under another element, or there may be one or more intermediate layers or elements. In addition, it may also be understood that when a layer or element is referred to as being "between" two layers or two elements, it may be the only layer disposed between the two layers or two elements, or more than one intermediate layer or element is disposed between the two layers or two elements. Similar reference numerals indicate similar elements throughout the specification.

In the present disclosure, terms "first" and "second" are only used for the purpose of description and cannot be understood as indicating or implying relative importance. The term "a plurality of" refers to two or more, unless otherwise clearly defined.

Described above are merely optional embodiments of the present disclosure, and are not intended to limit the present disclosure. Within the spirit and principles of the present disclosure, any modifications, equivalent substitutions, improvements, and the like should be included within the scope of protection of the present disclosure.

What is claimed is:

1. An array substrate, comprising:
a substrate;
a thin film transistor disposed on the substrate, wherein the thin film transistor comprises an active layer;
a first passivation layer disposed on the thin film transistor, wherein the thin film transistor is sheathed by the first passivation layer;
a transparent electrode disposed on the first passivation layer, wherein the transparent electrode is in contact with a side, distal from the thin film transistor, of the first passivation layer, and comprises a hollowed-out region, and an orthographic projection of the active layer on the substrate is within an orthographic projection of the hollowed-out region on the substrate; and
a no-load protective electrode within the hollowed-out region isolated from the transparent electrode, wherein the no-load protective electrode is conductive and in contact with a side, distal from the thin film transistor, of the first passivation layer, and the orthographic projection of the active layer on the substrate is within an orthographic projection of the no-load protective electrode on the substrate, wherein a minimum distance between an outer boundary of the orthographic projection of the no-load protective electrode on the substrate and an outer boundary of the orthographic projection of the active layer on the substrate is greater than or equal to 2 µm.

2. The array substrate according to claim 1, wherein a maximum distance between the outer boundary of the orthographic projection of the no-load protective electrode on the substrate and the outer boundary of the orthographic projection of the active layer on the substrate is less than or equal to 5 µm.

3. The array substrate according to claim 1, wherein the transparent electrode and the no-load protective electrode are disposed in a same layer and made of the same material.

4. The array substrate according to claim 3, wherein the transparent electrode is a common electrode, and the no-load protective electrode is a planar electrode.

5. The array substrate according to claim 3, wherein the transparent electrode is a pixel electrode, and the no-load protective electrode is a patterned electrode, wherein the patterned electrode comprises a slit structure.

6. The array substrate according to claim 3, wherein the transparent electrode and the no-load protective electrode are both made of a light-transmitting conductive material.

7. The array substrate according to claim 1, wherein the transparent electrode and the no-load protective electrode are disposed in a same layer and made of different materials.

8. The array substrate according to claim 7, wherein the no-load protective electrode is made of a light-shielding conductive material, and the transparent electrode is made of a light-transmitting conductive material.

9. The array substrate according to claim 1, wherein the no-load protective electrode is further isolated from any conductive medium other than the transparent electrode in the array substrate.

10. The array substrate according to claim 1, wherein the no-load protective electrode is lapped on a conductive medium in the array substrate, wherein the conductive medium is configured to be connected to a ground.

11. The array substrate according to claim 1, wherein the thin film transistor is a bottom gate type thin film transistor or a top gate type thin film transistor.

12. The array substrate according to claim 1, wherein the thin film transistor further comprises a gate electrode, a gate insulation layer, a source electrode, and a drain electrode;
wherein the gate electrode is disposed on a side, proximal to the substrate, of the active layer, the gate insulation layer is disposed between the gate electrode and the active layer, and the source electrode and the drain electrode are both disposed on a side, distal from the substrate, of the active layer, and both lapped on the active layer; and
the transparent electrode is a common electrode, and the array substrate further comprises a common electrode line disposed in a same layer as the gate electrode, wherein the gate insulation layer and the first passivation layer both comprise a first via hole, and the common electrode line is lapped on the transparent electrode via the first via hole.

13. The array substrate according to claim 12, further comprising: a second passivation layer disposed on the transparent electrode and the no-load protective electrode, and a pixel electrode disposed on the second passivation layer;
wherein the pixel electrode is in contact with a side, distal from the transparent electrode, of the second passivation layer, the first passivation layer and the second passivation layer both comprise a second via hole, and the pixel electrode is lapped on one of the source electrode and the drain electrode via the second via hole.

14. The array substrate according to claim 13, further comprising: a gate line electrically connected to the gate electrode, and a data line electrically connected to the other of the source electrode and the drain electrode;
wherein the gate line and the gate electrode are disposed in a same layer, the data line, the source electrode, and the drain electrode are disposed in a same layer, an extension direction of the gate line is intersected with an extension direction of the data line, and the extension direction of the gate line is parallel to an extension direction of the common electrode line.

15. The array substrate according to claim 14, wherein the data line comprises: a data line body and a jumper data line connected to each other; wherein on the substrate, an orthographic projection of the jumper data line is overlapped with an orthographic projection of at least one of the common electrode line and the gate line, and a width of the jumper data line is greater than a width of the data line body.

16. An array substrate, comprising:
a substrate;
a thin film transistor disposed on the substrate, wherein the thin film transistor comprises an active layer;
a first passivation layer disposed on the thin film transistor, wherein the thin film transistor is sheathed by the first passivation layer; and
a transparent electrode disposed on the first passivation layer, wherein the transparent electrode is in contact with a side, distal from the thin film transistor, of the first passivation layer, and comprises a hollowed-out region, and an orthographic projection of the active layer on the substrate is within an orthographic projection of the hollowed-out region on the substrate;
wherein a minimum distance between an outer boundary of the orthographic projection of the hollowed-out region on the substrate and an outer boundary of the orthographic projection of the active layer on the substrate is greater than or equal to 2 μm.

17. A display device, comprising: an array substrate and a color filter substrate arranged oppositely, and a liquid crystal layer disposed between the array substrate and the color filter substrate, wherein the array substrate comprises:
a substrate;
a thin film transistor disposed on the substrate, wherein the thin film transistor comprises an active layer;
a first passivation layer disposed on the thin film transistor, wherein the thin film transistor is sheathed by the first passivation layer;
a transparent electrode disposed on the first passivation layer, wherein the transparent electrode is in contact with a side, distal from the thin film transistor, of the first passivation layer, and comprises a hollowed-out region, and an orthographic projection of the active layer on the substrate is within an orthographic projection of the hollowed-out region on the substrate; and
a no-load protective electrode within the hollowed-out region and isolated from the transparent electrode, wherein the no-load protective electrode is conductive and in contact with a side, distal from the thin film transistor, of the first passivation layer, and the orthographic projection of the active layer on the substrate is within an orthographic projection of the no-load protective electrode on the substrate, wherein a minimum distance between an outer boundary of the orthographic projection of the no-load protective electrode on the substrate and an outer boundary of the orthographic projection of the active layer on the substrate is greater than or equal to 2 μm.

* * * * *